(12) United States Patent
Herslow et al.

(10) Patent No.: US 11,443,157 B2
(45) Date of Patent: Sep. 13, 2022

(54) CERAMIC-CONTAINING AND CERAMIC COMPOSITE TRANSACTION CARDS

(71) Applicant: CompoSecure, LLC, Somerset, NJ (US)

(72) Inventors: John Herslow, Bridgewater, NJ (US); Adam J. Lowe, Somerset, NJ (US)

(73) Assignee: CompoSecure, LLC, Somerset, NJ (US)

( * ) Notice: Subject to any disclaimer, the term of this patent is extended or adjusted under 35 U.S.C. 154(b) by 163 days.

(21) Appl. No.: 16/790,868

(22) Filed: Feb. 14, 2020

(65) Prior Publication Data

US 2020/0184303 A1  Jun. 11, 2020

Related U.S. Application Data

(63) Continuation of application No. 15/521,519, filed as application No. PCT/US2015/058820 on Nov. 3, (Continued)

(51) Int. Cl.
*G06K 19/077* (2006.01)
*G06K 19/07* (2006.01)
(Continued)

(52) U.S. Cl.
CPC .......... *G06K 19/07722* (2013.01); *B32B 3/04* (2013.01); *B32B 3/06* (2013.01);
(Continued)

(58) Field of Classification Search
CPC ............ G06K 19/07722; G06K 19/02; G06K 19/0723; B32B 3/04; B32B 3/06;
(Continued)

(56) References Cited

U.S. PATENT DOCUMENTS

| 1,601,287 A | 9/1926 | Bertinetti |
| 2,123,612 A | 7/1938 | Obert |

(Continued)

FOREIGN PATENT DOCUMENTS

| CN | 1172141 A | 2/1998 |
| CN | 1234888 A | 11/1999 |

(Continued)

OTHER PUBLICATIONS

Extended European Search Report for European Application No. 20206167.7, dated Feb. 16, 2021, 7 pages.

(Continued)

*Primary Examiner* — Thien M Le
*Assistant Examiner* — Asifa Habib
(74) *Attorney, Agent, or Firm* — RatnerPrestia

(57) ABSTRACT

A process for making a card includes the steps of forming a core layer having a first surface and a second surface, disposing an uncured decorative ceramic layer of ceramic particles disposed in a resin binder over the first surface of the core layer, such as by spray coating, and curing the uncured decorative ceramic layer to form a cured decorative ceramic layer. Card products of the process may have a core layer of metal, ceramic, or a combination thereof that form a bulk of the card.

46 Claims, 9 Drawing Sheets

Related U.S. Application Data 2015, now Pat. No. 10,783,422, which is a continuation-in-part of application No. 14/718,596, filed on May 21, 2015, now Pat. No. 10,922,601.

(60) Provisional application No. 62/074,305, filed on Nov. 3, 2014.

(51) Int. Cl.

| | | |
|---|---|---|
| *B32B 13/04* | (2006.01) | |
| *B32B 9/00* | (2006.01) | |
| *B32B 21/14* | (2006.01) | |
| *B32B 37/12* | (2006.01) | |
| *B32B 38/14* | (2006.01) | |
| *C25D 11/24* | (2006.01) | |
| *B32B 7/12* | (2006.01) | |
| *B32B 37/18* | (2006.01) | |
| *B32B 9/04* | (2006.01) | |
| *B32B 15/04* | (2006.01) | |
| *B32B 38/10* | (2006.01) | |
| *C25D 5/02* | (2006.01) | |
| *C25D 11/34* | (2006.01) | |
| *B32B 21/08* | (2006.01) | |
| *C25D 11/26* | (2006.01) | |
| *B32B 27/08* | (2006.01) | |
| *C25D 11/04* | (2006.01) | |
| *B32B 15/14* | (2006.01) | |
| *B32B 27/12* | (2006.01) | |
| *B32B 13/06* | (2006.01) | |
| *B32B 15/08* | (2006.01) | |
| *C25D 11/18* | (2006.01) | |
| *B32B 9/02* | (2006.01) | |
| *B32B 21/00* | (2006.01) | |
| *B32B 33/00* | (2006.01) | |
| *B32B 27/38* | (2006.01) | |
| *B32B 13/12* | (2006.01) | |
| *B32B 38/00* | (2006.01) | |
| *B32B 3/26* | (2006.01) | |
| *B32B 38/06* | (2006.01) | |
| *B32B 3/08* | (2006.01) | |
| *B32B 3/04* | (2006.01) | |
| *B32B 27/30* | (2006.01) | |
| *B32B 21/04* | (2006.01) | |
| *B32B 27/36* | (2006.01) | |
| *G06K 19/02* | (2006.01) | |
| *B32B 3/06* | (2006.01) | |
| *B32B 15/082* | (2006.01) | |
| *B32B 3/30* | (2006.01) | |
| *B32B 18/00* | (2006.01) | |
| *B32B 15/20* | (2006.01) | |
| *B32B 15/10* | (2006.01) | |
| *B32B 17/00* | (2006.01) | |
| *B32B 15/18* | (2006.01) | |
| *B32B 15/09* | (2006.01) | |
| *B32B 27/06* | (2006.01) | |
| *B32B 27/18* | (2006.01) | |

(52) U.S. Cl.
CPC ............ *B32B 3/08* (2013.01); *B32B 3/266* (2013.01); *B32B 3/30* (2013.01); *B32B 7/12* (2013.01); *B32B 9/00* (2013.01); *B32B 9/005* (2013.01); *B32B 9/025* (2013.01); *B32B 9/04* (2013.01); *B32B 9/041* (2013.01); *B32B 9/042* (2013.01); *B32B 9/045* (2013.01); *B32B 9/047* (2013.01); *B32B 13/04* (2013.01); *B32B 13/06* (2013.01); *B32B 13/12* (2013.01); *B32B 15/04* (2013.01); *B32B 15/043* (2013.01); *B32B 15/08* (2013.01); *B32B 15/082* (2013.01); *B32B 15/09* (2013.01); *B32B 15/10* (2013.01); *B32B 15/14* (2013.01); *B32B 15/18* (2013.01); *B32B 15/20* (2013.01); *B32B 17/00* (2013.01); *B32B 18/00* (2013.01); *B32B 21/00* (2013.01); *B32B 21/04* (2013.01); *B32B 21/08* (2013.01); *B32B 21/14* (2013.01); *B32B 27/06* (2013.01); *B32B 27/08* (2013.01); *B32B 27/12* (2013.01); *B32B 27/304* (2013.01); *B32B 27/36* (2013.01); *B32B 27/365* (2013.01); *B32B 27/38* (2013.01); *B32B 33/00* (2013.01); *B32B 37/12* (2013.01); *B32B 37/18* (2013.01); *B32B 38/06* (2013.01); *B32B 38/10* (2013.01); *B32B 38/14* (2013.01); *B32B 38/145* (2013.01); *C25D 5/022* (2013.01); *C25D 11/04* (2013.01); *C25D 11/18* (2013.01); *C25D 11/243* (2013.01); *C25D 11/26* (2013.01); *C25D 11/34* (2013.01); *G06K 19/02* (2013.01); *G06K 19/0723* (2013.01); *B32B 27/18* (2013.01); *B32B 38/0012* (2013.01); *B32B 38/105* (2013.01); *B32B 2038/0016* (2013.01); *B32B 2250/02* (2013.01); *B32B 2250/03* (2013.01); *B32B 2250/04* (2013.01); *B32B 2250/40* (2013.01); *B32B 2255/00* (2013.01); *B32B 2255/06* (2013.01); *B32B 2255/08* (2013.01); *B32B 2255/10* (2013.01); *B32B 2255/20* (2013.01); *B32B 2255/205* (2013.01); *B32B 2255/26* (2013.01); *B32B 2255/28* (2013.01); *B32B 2264/108* (2013.01); *B32B 2270/00* (2013.01); *B32B 2307/40* (2013.01); *B32B 2307/402* (2013.01); *B32B 2307/4023* (2013.01); *B32B 2307/4026* (2013.01); *B32B 2307/412* (2013.01); *B32B 2307/58* (2013.01); *B32B 2307/584* (2013.01); *B32B 2307/732* (2013.01); *B32B 2307/75* (2013.01); *B32B 2311/24* (2013.01); *B32B 2313/04* (2013.01); *B32B 2315/02* (2013.01); *B32B 2317/08* (2013.01); *B32B 2317/16* (2013.01); *B32B 2363/00* (2013.01); *B32B 2425/00* (2013.01); *C25D 11/246* (2013.01); *Y10T 29/49004* (2015.01); *Y10T 29/49828* (2015.01); *Y10T 156/10* (2015.01); *Y10T 156/1039* (2015.01); *Y10T 156/1082* (2015.01)

(58) Field of Classification Search
CPC .. B32B 3/08; B32B 3/266; B32B 3/30; B32B 7/08; B32B 7/12; B32B 9/00; B32B 9/005; B32B 9/025; B32B 9/04; B32B 9/041; B32B 9/042; B32B 9/045; B32B 9/047; B32B 13/04; B32B 13/06; B32B 13/12; B32B 15/04; B32B 15/043; B32B 15/08; B32B 15/082; B32B 15/09; B32B 15/10; B32B 15/14; B32B 15/18; B32B 15/20; B32B 17/00; B32B 18/00; B32B 21/00; B32B 21/04; B32B 21/08; B32B 21/14; B32B 27/06; B32B 27/08; B32B 27/12; B32B 27/304; B32B 27/36; B32B 27/365; B32B 27/38; B32B 33/00; B32B 37/12; B32B 37/18; B32B 38/06; B32B 38/10; B32B 38/14; B32B 38/145; B32B 27/18; B32B 38/0012; B32B 38/105; B32B 2038/0016; B32B 2250/02; B32B 2250/03; B32B 2250/04; B32B 2250/40; B32B 2255/00; B32B 2255/06; B32B 2255/08; B32B 2255/10; B32B 2255/20;

B32B 2255/205; B32B 2255/26; B32B 2255/28; B32B 2264/108; B32B 2270/00; B32B 2307/40; B32B 2307/402; B32B 2307/4023; B32B 2307/4026; B32B 2307/412; B32B 2307/58; B32B 2307/584; B32B 2307/732; B32B 2307/75; B32B 2311/24; B32B 2313/04; B32B 2315/02; B32B 2317/08; B32B 2317/16; B32B 2363/00; B32B 2425/00; C25D 5/022; C25D 7/00; C25D 11/04; C25D 11/18; C25D 11/243; C25D 11/26; C25D 11/34; C25D 11/246; Y10T 29/49004; Y10T 29/49828; Y10T 156/10; Y10T 156/1039; Y10T 156/1082

See application file for complete search history.

(56) References Cited

U.S. PATENT DOCUMENTS

| | | | |
|---|---|---|---|
| 2,205,466 | A | 6/1940 | Caprio et al. |
| 4,278,377 | A | 7/1981 | Elineau |
| 4,343,851 | A | 8/1982 | Sheptak |
| 4,499,126 | A | 2/1985 | Suzuki et al. |
| 4,692,394 | A | 9/1987 | Drexler |
| 4,711,690 | A | 12/1987 | Haghiri-Tehrani |
| 4,971,646 | A | 11/1990 | Schell et al. |
| 5,045,511 | A | 9/1991 | Bosomworth et al. |
| 5,173,133 | A | 12/1992 | Morin et al. |
| 5,292,616 | A | 3/1994 | Fujita et al. |
| 5,526,664 | A | 6/1996 | Vetter |
| 5,543,269 | A | 8/1996 | Chatterjee et al. |
| 5,549,953 | A | 8/1996 | Li |
| 5,574,309 | A | 11/1996 | Papapietro et al. |
| 5,702,666 | A | 12/1997 | Hatakeyama et al. |
| 5,804,285 | A | 9/1998 | Kobayashi et al. |
| 5,843,599 | A | 12/1998 | Paz-Pujalt et al. |
| 5,892,661 | A | 4/1999 | Stafford et al. |
| 6,158,663 | A | 12/2000 | Ochiai |
| 6,198,155 | B1 | 3/2001 | Verhaegh et al. |
| 6,214,155 | B1 | 4/2001 | Leighton |
| 6,254,951 | B1 | 7/2001 | Marmalich |
| 6,364,983 | B1 | 4/2002 | Kay |
| 6,478,228 | B1 | 11/2002 | Ikefuji et al. |
| 6,581,839 | B1 | 6/2003 | Lasch et al. |
| 6,589,642 | B1 | 7/2003 | Miller et al. |
| 6,607,135 | B1 | 8/2003 | Hirai et al. |
| 6,644,552 | B1 | 11/2003 | Herslow |
| 6,764,005 | B2 | 7/2004 | Cooper |
| 6,853,286 | B2 | 2/2005 | Nikawa et al. |
| 6,857,569 | B1 | 2/2005 | Smith et al. |
| 7,022,202 | B2 | 4/2006 | Goertzen |
| 7,029,547 | B2 | 4/2006 | Biller |
| 7,063,924 | B2 | 6/2006 | Kaminsky et al. |
| 7,134,603 | B2 | 11/2006 | Batoha |
| 7,287,704 | B2 | 10/2007 | Herslow |
| D573,182 | S | 7/2008 | Ricketts et al. |
| 7,398,917 | B2 | 7/2008 | Aibazov et al. |
| 7,494,057 | B2 | 2/2009 | Lasch et al. |
| 7,503,503 | B2 | 3/2009 | Riedl et al. |
| 7,530,491 | B2 | 5/2009 | Lasch et al. |
| 7,544,266 | B2 | 6/2009 | Herring et al. |
| 7,588,184 | B2 | 9/2009 | Gandel et al. |
| 7,757,957 | B2 | 7/2010 | Cranston et al. |
| 7,763,179 | B2 | 7/2010 | Levy et al. |
| 7,823,777 | B2 | 11/2010 | Varga et al. |
| D632,735 | S | 2/2011 | McGrane et al. |
| 7,909,258 | B2 | 3/2011 | Kim |
| 8,033,457 | B2 | 10/2011 | Varga et al. |
| 8,087,698 | B2 | 1/2012 | Jones et al. |
| 8,356,757 | B2 | 1/2013 | Sonoda et al. |
| 8,397,998 | B1 | 3/2013 | Mann et al. |
| D687,886 | S | 8/2013 | Ahrabian |
| 8,579,201 | B2 | 11/2013 | Akesson |
| 8,672,232 | B2 | 3/2014 | Herslow |
| 8,725,589 | B1 | 5/2014 | Skelding et al. |
| 8,752,277 | B2 | 6/2014 | Orihara et al. |
| 8,755,121 | B2 | 6/2014 | Cape et al. |
| 8,944,810 | B2 | 2/2015 | Herslow |
| 9,016,591 | B2 | 4/2015 | Herslow et al. |
| 9,070,053 | B2 | 6/2015 | Mosteller |
| 9,300,251 | B2 | 3/2016 | Khitun et al. |
| 9,327,484 | B2 | 5/2016 | Herring et al. |
| 9,390,363 | B1 | 7/2016 | Herslow et al. |
| 9,390,366 | B1 | 7/2016 | Herslow et al. |
| 9,542,635 | B2 | 1/2017 | Herslow |
| 9,569,718 | B2 | 2/2017 | Herslow |
| 10,399,905 | B2 | 9/2019 | Ketcham et al. |
| 10,783,422 | B2 | 9/2020 | Herslow et al. |
| 2001/0035588 | A1 | 11/2001 | Aga |
| 2001/0049004 | A1 | 12/2001 | Wilkie |
| 2002/0007906 | A1 | 1/2002 | Droz |
| 2002/0096569 | A1 | 7/2002 | Boutaghou et al. |
| 2003/0038174 | A1 | 2/2003 | Jones |
| 2003/0065938 | A1 | 4/2003 | Kitamura et al. |
| 2003/0136848 | A1 | 7/2003 | Kiekhaefer |
| 2003/0223616 | A1 | 12/2003 | D'Amato et al. |
| 2003/0234286 | A1 | 12/2003 | Labrec et al. |
| 2004/0031855 | A1 | 2/2004 | Takahashi |
| 2004/0131756 | A1 | 7/2004 | Skierski et al. |
| 2004/0217178 | A1 | 11/2004 | Lasch et al. |
| 2005/0003297 | A1 | 1/2005 | Labrec |
| 2005/0040243 | A1 | 2/2005 | Bi et al. |
| 2005/0095408 | A1 | 5/2005 | LeBrec et al. |
| 2005/0242194 | A1 | 11/2005 | Jones et al. |
| 2006/0102729 | A1 | 5/2006 | Gandel et al. |
| 2007/0089831 | A1 | 4/2007 | Florentino et al. |
| 2008/0129037 | A1 | 6/2008 | Roth et al. |
| 2008/0164307 | A1 | 7/2008 | Silverstein |
| 2008/0166482 | A1 | 7/2008 | Frye et al. |
| 2008/0274225 | A1 | 11/2008 | Bharadwai et al. |
| 2008/0296887 | A1 | 12/2008 | Baggenstos |
| 2008/0309064 | A1 | 12/2008 | Herlin et al. |
| 2009/0020523 | A1 | 1/2009 | DeMichael et al. |
| 2009/0032602 | A1 | 2/2009 | Nishi et al. |
| 2009/0169776 | A1 | 7/2009 | Herslow |
| 2009/0179817 | A1 | 7/2009 | Yin |
| 2009/0208766 | A1 | 8/2009 | Suzuki et al. |
| 2009/0213149 | A1 | 8/2009 | Barton et al. |
| 2009/0218401 | A1 | 9/2009 | Moran et al. |
| 2009/0294543 | A1 | 12/2009 | Varga et al. |
| 2009/0314424 | A1 | 12/2009 | Herring et al. |
| 2009/0315316 | A1 | 12/2009 | Staub et al. |
| 2010/0021740 | A1 | 1/2010 | Tanaka et al. |
| 2010/0059266 | A1 | 3/2010 | Yoo et al. |
| 2010/0068395 | A1 | 3/2010 | Moriya et al. |
| 2010/0116891 | A1 | 5/2010 | Yano et al. |
| 2010/0224959 | A1 | 9/2010 | Scherabon et al. |
| 2010/0276497 | A1 | 11/2010 | Seban et al. |
| 2011/0020606 | A1 | 1/2011 | Herslow et al. |
| 2011/0031319 | A1 | 2/2011 | Kiekhaefer et al. |
| 2011/0079344 | A1 | 4/2011 | Sheu |
| 2011/0101113 | A1 | 5/2011 | Konjima et al. |
| 2011/0226858 | A1 | 9/2011 | Lasch et al. |
| 2011/0309146 | A1 | 12/2011 | Zazzu et al. |
| 2012/0208030 | A1 | 8/2012 | Audenaert |
| 2012/0270019 | A1 | 10/2012 | Wachter et al. |
| 2012/0325914 | A1 | 12/2012 | Herslow |
| 2013/0008796 | A1 | 1/2013 | Silverman et al. |
| 2013/0029155 | A1* | 1/2013 | Nair ............... C08J 9/283 428/407 |
| 2013/0033407 | A1 | 2/2013 | Chae et al. |
| 2013/0067842 | A1 | 3/2013 | Meersseman et al. |
| 2013/0119147 | A1 | 5/2013 | Varga et al. |
| 2013/0126622 | A1 | 5/2013 | Finn |
| 2013/0221089 | A1 | 8/2013 | Kreutzer |
| 2013/0248607 | A1 | 9/2013 | Zlotnik |
| 2013/0258622 | A1* | 10/2013 | Cox ............... B32B 37/10 361/762 |
| 2013/0287267 | A1 | 10/2013 | Varone |
| 2014/0144993 | A1 | 5/2014 | Seo et al. |
| 2014/0224881 | A1 | 8/2014 | Herslow |
| 2015/0115039 | A1 | 4/2015 | Mosteller |
| 2015/0119502 | A1 | 4/2015 | Nam et al. |
| 2015/0136856 | A1 | 5/2015 | Herslow et al. |

(56) References Cited

U.S. PATENT DOCUMENTS

| | | |
|---|---|---|
| 2015/0180229 A1 | 6/2015 | Herslow |
| 2015/0206047 A1 | 7/2015 | Herslow et al. |
| 2015/0236235 A1 | 8/2015 | Ladizinsky et al. |
| 2015/0298429 A1 | 10/2015 | Ricketts et al. |
| 2015/0339564 A1 | 11/2015 | Herslow et al. |
| 2016/0042268 A1 | 2/2016 | Puttkammer |
| 2016/0110639 A1 | 4/2016 | Finn et al. |
| 2016/0180212 A1 | 6/2016 | Herslow et al. |
| 2016/0229081 A1 | 8/2016 | Williams et al. |
| 2016/0232438 A1 | 8/2016 | Williams et al. |
| 2016/0357062 A1 | 12/2016 | Li |
| 2017/0017871 A1 | 1/2017 | Finn et al. |
| 2017/0077589 A1 | 3/2017 | Finn et al. |
| 2017/0185885 A1 | 6/2017 | Skelding et al. |
| 2018/0269352 A1 | 9/2018 | Tian et al. |
| 2019/0204812 A1* | 7/2019 | Cox ................. G06K 19/07722 |
| 2019/0233655 A1 | 8/2019 | Kimpel et al. |
| 2019/0324574 A1 | 10/2019 | Schooley et al. |
| 2020/0082396 A1 | 3/2020 | Chow |

FOREIGN PATENT DOCUMENTS

| | | |
|---|---|---|
| CN | 1241969 A | 1/2000 |
| CN | 2521676 Y | 11/2002 |
| CN | 102263327 A | 11/2011 |
| DE | 4131617 A1 | 4/1992 |
| EP | 0559115 A1 | 9/1993 |
| EP | 2405311 A1 | 1/2012 |
| JP | 5430908 U | 2/1979 |
| JP | 199663 U | 7/1989 |
| JP | 0615993 A | 1/1994 |
| JP | 0672082 A | 3/1994 |
| JP | 07155970 A | 6/1995 |
| JP | 11345298 A | 12/1999 |
| JP | 3066278 U | 2/2000 |
| JP | 2000168276 A | 6/2000 |
| JP | 2002189433 A | 7/2002 |
| JP | 2002259933 A | 9/2002 |
| JP | 2002370457 A | 12/2002 |
| JP | 2004025546 A | 1/2004 |
| JP | 2004063551 A | 2/2004 |
| JP | 2004265176 A | 9/2004 |
| JP | 2005104105 A | 4/2005 |
| JP | 2007128393 A | 5/2007 |
| JP | 3144889 U | 9/2008 |
| JP | 2009096027 A | 5/2009 |
| JP | 2011521377 A | 7/2011 |
| JP | 2012018324 A | 1/2012 |
| JP | 2015512348 A | 4/2015 |
| KR | 20100066148 A | 6/2010 |
| KR | 20130006358 A | 1/2013 |
| KR | 20140083067 A | 7/2014 |
| KR | 101699412 B1 | 1/2017 |
| WO | 2004063977 A2 | 7/2004 |
| WO | 2006081385 A1 | 8/2006 |
| WO | 2007133163 A1 | 11/2007 |
| WO | 2012121494 A2 | 9/2012 |
| WO | 2015179639 A1 | 11/2015 |
| WO | 2016073473 A1 | 5/2016 |

OTHER PUBLICATIONS

Japanese Notice of Reasons for Rejection for Japanese Application No. 2020-038027, dated Apr. 13, 2021 with translation, 14 pages.
Japanese Notice of Reasons for Rejection for Japanese Application No. 2019-003489, dated May 12, 2020 with translation, 16 pages.
Indian Examination Report for Indian Application No. 201717017958, dated Oct. 20, 2020 with translation, 7 pages.
Non Final Office Action for U.S. Appl. No. 15/861,321, dated Apr. 17, 2020, 50 pages.
Non Final Office Action for U.S. Appl. No. 15/860,286, dated Apr. 16, 2020, 68 pages.
Japanese Notice of Reasons for Rejection for Japanese Application No. 2019-178994, dated Oct. 5, 2021 with translation, 9 pages.
Japanese Notice of Reasons for Rejection for Japanese Application No. 2019-178994, dated Oct. 27, 2020 with translation, 9 pages.
Non Final Office Action for U.S. Appl. No. 14/718,596, dated Jul. 23, 2020, 38 pages.
Indonesian Substantive Examination Result for Indonesian Application No. PID201702718, dated Jul. 22, 2021, with translation, 4 pages.
New Zealand Patent Examination Report for New Zealand Application No. 743934, dated Aug. 12, 2021, 5 pages.
Final Office Action for U.S. Appl. No. 15/861,321, dated Jul. 21, 2021, 19 pages.
Australian Examination Report for Australian Application No. 2020213417, dated Jul. 22, 2021, 4 pages.
Notice of Allowance for U.S. Appl. No. 14/718,596, dated Oct. 16, 2020, 30 pages.
Australian Examination Report for Australian Application No. 2015264126, dated Jan. 31, 2018, 4 pages.
Chinese Office Action for Chinese Application No. 201580026503.9, dated Nov. 23, 2018, 13 pages.
Chinese Office Action for Chinese Application No. 201580059209.8, dated Jun. 10, 2019, 15 pages.
Chinese Office Action for Chinese Application No. 201580026503.9, dated Jun. 21, 2019, with translation, 18 pages.
Chinese Office Action for Chinese Application No. 201580059209.8, dated Feb. 3, 2020, with partial translation, 15 pages.
Columbian Office Action for Columbian Application No. NC2017/0004295, dated Aug. 16, 2018, with English language remarks, 20 pages.
Columbian Office Action for Columbian Application No. NC2017/0004295, dated Dec. 19, 2018, 13 pages.
Dai Dahuang, "Films and Coatings", Modern Surface Technology, 2008, 10 pages.
European Communication for European Application No. 15796355.4, dated Aug. 2, 2018, 4 pages.
European Communication for European Application No. 15856207.4, dated Jun. 6, 2018, 9 pages.
European Communication for European Application No. 15856207.4, dated Mar. 25, 2019, 5 pages.
Extended European Search Report for European Application No. 15796355.4, dated Nov. 13, 2017, 8 pages.
Final Office Action for U.S. Appl. No. 14/718,596, dated Jan. 30, 2018, 22 pages.
Final Office Action for U.S. Appl. No. 15/379,569, dated Feb. 20, 2019, 26 pages.
International Preliminary Report on Patentability for International Application No. PCT/US2015/058820, dated May 9, 2017, 8 pages.
International Search Report and Written Opinion of the International Searching Authority for International Application No. PCT/US2015/031971, dated Sep. 30, 2015, 20 pages.
International Search Report and Written Opinion of the International Searching Authority for International Application No. PCT/US2015/058820, dated Feb. 19, 2016, 11 pages.
Japanese Decision of Final Rejection for Japanese Application No. 2017-543283, dated Nov. 20, 2018, with translation, 5 pages.
Notice of Reasons for Rejection for Japanese Application No. 2017-543283, dated May 8, 2018, with translation, 7 pages.
Notice of Reasons for Rejection for Japanese Application No. 2017-513610, dated Jul. 10, 2018, with translation, 12 pages.
Notice of Reasons for Rejection for Japanese Application No. 2019-045862, dated Oct. 15, 2019, with translation, 8 pages.
New Zealand Examination Report for New Zealand Application No. 726408, dated Sep. 25, 2017, 15 pages.
New Zealand Examination Report for New Zealand Application No. 726408, dated Mar. 1, 2018, 5 pages.
New Zealand Examination Report for New Zealand Application No. 726408, dated Jul. 20, 2018, 5 pages.
New Zealand Examination Report for New Zealand Application No. 726408, dated Aug. 22, 2018, 4 pages.
Non Final Office Action for U.S. Appl. No. 14/718,596, dated Aug. 11, 2017, 24 pages.

(56) References Cited

OTHER PUBLICATIONS

Non Final Office Action for U.S. Appl. No. 15/379,569, dated May 17, 2018, 46 pages.
Non Final Office Action for U.S. Appl. No. 14/718,596, dated May 22, 2018, 18 pages.
Non Final Office Action for U.S. Appl. No. 14/718,596, dated Apr. 8, 2019, 29 pages.
Notice of Allowance for U.S. Appl. No. 15/379,569, dated Dec. 2, 2019, 33 pages.
Singapore Written Opinion for Singapore Application No. 11201609690Y, dated Jul. 13, 2017, 8 pages.
Singapore Written Opinion for Singapore Application No. 11201703216R, dated Jan. 16, 2018, 5 pages.
Wikipedia.com, Tetraethyl Orthosilicate, downloaded from https://en.wikipedia.org/wiki/Tetraethyl_orthosilicate, Dec. 21, 2018, 3 pages.
Japanese Decision of Final Rejection for Japanese Application No. 2017-513610, dated May 28, 2017, with translation, 9 pages.
Entire patent prosecution history for U.S. Appl. No. 14/718,596, filed May 21, 2015, entitled "Transaction and ID Cards Having Selected Texture and Coloring".
Entire patent prosecution history for U.S. Appl. No. 15/379,569, filed Dec. 15, 2016, entitled "Transaction and ID Cards Having Selected Texture and Coloring".
Entire patent prosecution history for U.S. Appl. No. 12/460,829, filed Jul. 24, 2009, entitled "Card With Embedded Image".
Entire patent prosecution history for U.S. Appl. No. 14/977,553, filed Dec. 21, 2015, entitled "Smart Metal Card With Radio Frequency (RF) Transmission Capability".
Entire patent prosecution history for U.S. Appl. No. 14/178,436, filed Feb. 12, 2014 entitled "Durable Card".
Entire patent prosecution history for U.S. Appl. No. 15/637,092, filed Jun. 29, 2017, entitled "Durable Card".
Entire patent prosecution history for U.S. Appl. No. 12/006,68, filed Dec. 31, 2007, entitled "Foil Composite Card", now U.S. Pat. No. 9,542,635, issued Jan. 10, 2017.
Entire patent prosecution history for U.S. Appl. No. 14/183,868, filed Feb. 19, 2014, entitled "Foil Composite Card".
Entire patent prosecution history for U.S. Appl. No. 15/355,018, filed Nov. 17, 2016, entitled "Foil Composite Card".
Entire patent prosecution history for U.S. Appl. No. 15/356,586, filed Nov. 19, 2016, entitled, "Foil Composite Card".
Entire patent prosecution history for U.S. Appl. No. 15/521,519, filed Apr. 24, 2017, entitled, "Ceramic-containing and Ceramic Composite Transaction Cards".
Notice of Allowance for U.S. Appl. No. 15/860,286, dated Sep. 4, 2020, 25 pages.
Japanese Notice of Reasons for Rejection for Japanese Application No. 2017-543283, dated Aug. 25, 2020 with translation, 13 pages.
European Communication Pursuant to Article 94(3) for European Application No. 15856207.4, dated Sep. 4, 2020, 4 pages.
Final Office Action for U.S. Appl. No. 15/861,321, dated Apr. 14, 2022, 32 pages.

\* cited by examiner

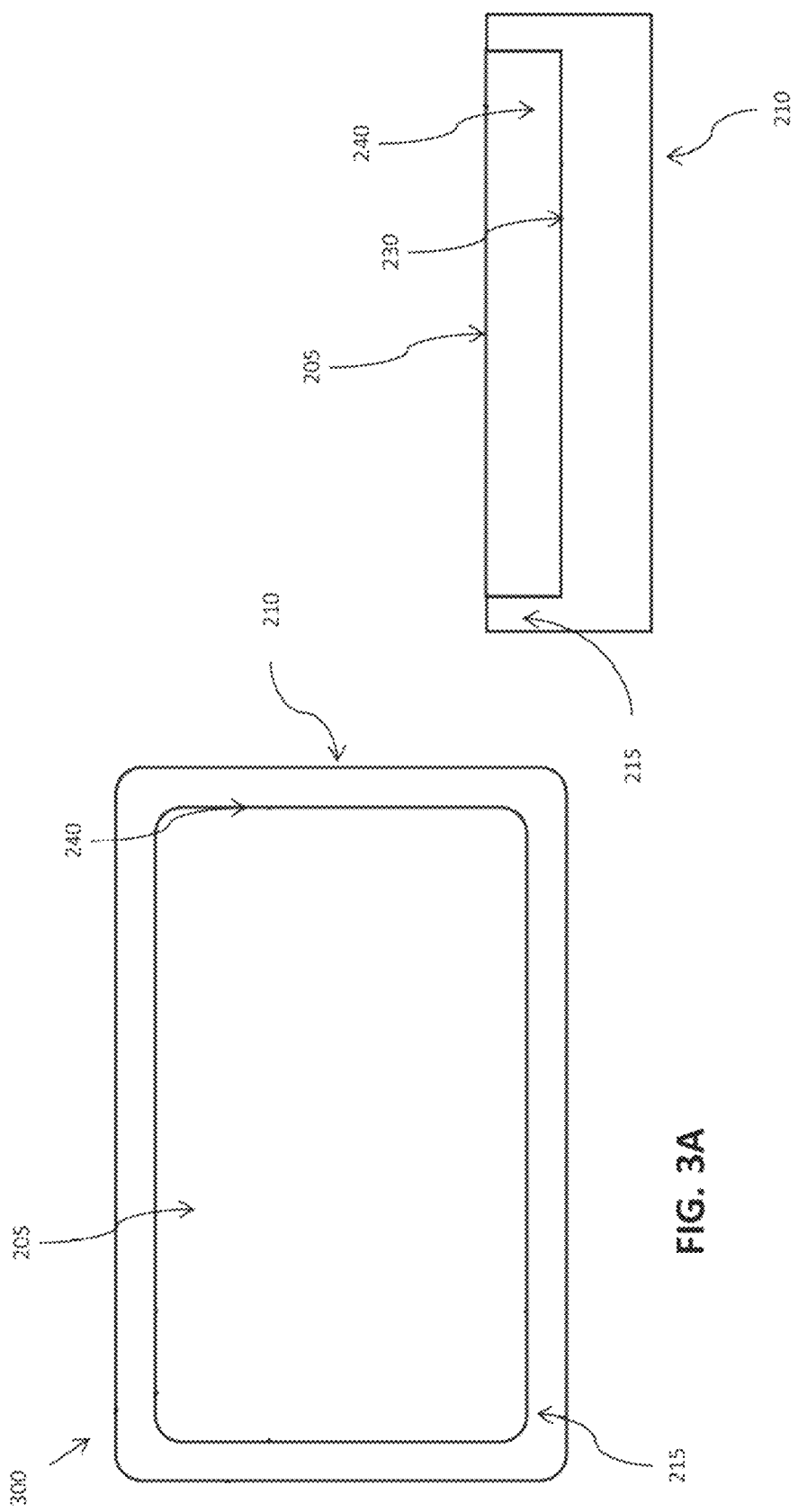

CERAMIC-CONTAINING AND CERAMIC COMPOSITE TRANSACTION CARDS

CROSS REFERENCE TO RELATED APPLICATIONS

This application is a continuation of U.S. application Ser. No. 15/521,519, which is a National Stage application filed Apr. 24, 2017, as a U.S. National Stage under 35 U.S.C. § 371 of International App. No. PCT/US2015/058820, filed Nov. 3, 2015, which is a Continuation-in-Part of U.S. patent application Ser. No. 14/718,596, filed May 21, 2015, and which claims priority to U.S. Provisional Patent Application No. 62/074,305, filed Nov. 3, 2014. The disclosures of all of the foregoing are incorporated herein by reference in their entirety for all purposes.

FIELD OF THE INVENTION

This invention relates to the field of transaction cards and, more particularly, transaction cards having at least one layer or coating of ceramic.

BACKGROUND OF THE INVENTION

Conventional transaction cards are made from thermoplastic materials, such as polyvinyl chloride (PVC) and polyethylene terephthalate (PET). These "standard" transaction cards suffer from low durability and are susceptible to degradation and/or destruction due to environmental factors. For example, exposure to sunlight and/or moisture can result in the disruption of the chemical bonds in the plastic, causing the transaction card to warp, crack, and/or fade. Similarly, plastic cards are easily bent or severed. In both cases, a plastic transaction card may become unusable due to this damage.

In the modern transactional card market, it is often desirable to obtain a "premium" feel, look, or tactile feature that may be marketed to an affluent market. These transactional cards may be used as debit cards, credit cards, or pre-paid cards. As part of this premium feel, a card that is heavier than a standard plastic card is often desired, as well as an increased durability of the card body due to the cost of card.

Existing premium transaction cards are typically made entirely or partially from metal. Metal cards demonstrate an enhanced durability as compared to the standard plastic card. However, some metal cards may disadvantageously: 1) require extensive machining; 2) produce electrostatic discharge; and 3) interfere with radio frequency radiation for contactless transactions.

SUMMARY OF THE INVENTION

Various aspects of the invention relate to transaction cards.

One aspect of the invention comprises a transaction card having a monolithic ceramic card body including one or more pockets, and at least one of a magnetic stripe, a barcode, and a laser signature portion.

Another aspect of the invention comprises a transaction card having a substrate layer having a first side and a second side. A first ceramic layer is connected to the first side of the substrate layer.

Yet another aspect of the invention comprises a transaction card having a substrate core layer having a first side and a second side. A first ceramic layer is connected to the first side of the substrate core layer. A second ceramic layer is connected to the second side of the substrate core layer.

Still another aspect of the invention comprises a transaction card having a substrate core layer having a first side and a second side. A first ceramic layer is connected to the first side of the substrate core layer. A second ceramic layer is connected to the second side of the substrate core layer. The first side and the second side of the substrate core layer define pockets on each side of the substrate core layer, and the first ceramic layer and the second ceramic layer are disposed in the pockets.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings, with like elements having the same reference numerals. When a plurality of similar elements are present, a single reference numeral may be assigned to the plurality of similar elements with a small letter designation referring to specific elements. When referring to the elements collectively or to a non-specific one or more of the elements, the small letter designation may be dropped. This emphasizes that according to common practice, the various features of the drawings are not drawn to scale unless otherwise indicated. On the contrary, the dimensions of the various features may be expanded or reduced for clarity. Included in the drawings are the following figures:

FIG. 3A depicts a plan view of an exemplary transaction card comprising a ceramic layer set into a pocket in a substrate FIG. 3B depicts a cross-sectional view of the exemplary transaction card of FIG. 3A.

FIG. 46 depicts a cross-sectional view of another exemplary transaction card construction comprising a substrate layer, a first ceramic layer and a second ceramic layer.

DETAILED DESCRIPTION OF THE INVENTION

Aspects of the invention relate to transaction cards. As used herein, transaction cards, also known as data cards or smart cards, include credit cards, debit cards, check cards, stored-value cards, gift cards, retail cards, or any other transaction card. Both "contact" and "contactless" bi-directional communication data transaction cards are included. Transaction cards may be provided with either with electrical contacts for effecting direct electrical contact with a card reader, or with an antenna coil for effecting contactless bi-directional communication with a remote card reader. Transaction cards may also be provided with both "contact" and "contactless" platforms, e.g., dual interface cards.

The inventors have recognized that it would be useful to provide a transaction card that provides a premium feel, look, or tactile feature and that avoids the disadvantages associated with some metal-based transaction cards. The inventors have further recognized that, by employing transaction cards comprised entirely of ceramic, having ceramic inserts, or utilizing a ceramic coating, that transaction cards may be obtained in a variety of colors and with a variety of desired features such as, e.g., laser signatures or decorative designs. The inventors have also realized that the use of ceramic materials offers new possibilities to increase card lifespan and to make counterfeiting more challenging. The inventors have recognized that these benefits may be realized in transaction cards created entirely of ceramic, having ceramic inserts, or utilizing a ceramic coating.

Figure 1:
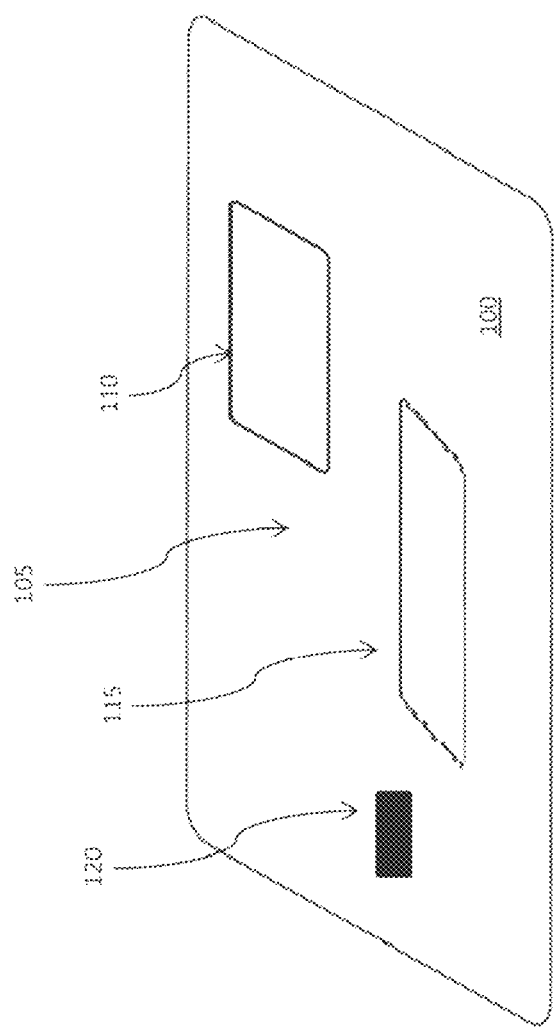
FIG. 1 depicts an exemplary transaction card having a monolithic ceramic body.

FIG. 1 depicts a transaction card 100 having a monolithic ceramic body 105 according to one aspect of the present invention.

Monolithic ceramic body 105 may be manufactured from one or more materials including zirconia, alumina, beryllia, ceria, ceramide, carbide, boride, nitride, and silicide. In one embodiment, monolithic ceramic body 105 is a yttrium-stabilized zirconia. One of ordinary skill in the art will understand that other ceramic materials may be used without departing from the spirit of the invention disclosed herein.

One or more pockets 110 in monolithic ceramic body 105 are configured to receive a variety of components including, e.g., at least one of a magnetic stripe, a barcode, one or more embedded microchips, a hologram, a signature panel, commercial indicia, or any other component typically contained on or within a transaction card. Embedded microchip 120 may comprise a contact chip module, a contactless chip module, a dual interface chip module, or a booster antenna. One or more pockets 110 may also be provided for decorative purposes.

In one embodiment, a magnetic stripe is bonded directly to a polished surface of monolithic ceramic body 105. A variety of adhesives are suitable to perform this bonding including, but not limited to heat-curable vinyl acetate.

Transaction card 100 may further include at least one security feature 120. The security feature 120 may comprise, for example, one or more through holes, windows, microtext, lumiphores, or combination thereof, as well as other such features known in the art. In an exemplary embodiment, all or a portion of monolithic ceramic body 105 is doped with a lumiphore, such as for example inorganic materials including $NaGdF_4$:Yb/Tm, $Y_2SiO_5$:Pr/Li, $Y_2O_3$:Eu, $LaPO_4$:Ce/Tb, and organic/inorganic hybrid materials including quantum dots and CU dots without limitation thereto, such that incident wavelengths of light are quenched, upconverted, or downconverted. In this respect, the inclusion of lumiphores permits the creation of a unique light-based "watermark".

Various colors and textures may be imparted to transaction card 100. Color may be introduced to transaction card 100 by an overcoat or by adding pigments and/or dyes into the ceramic body. In one embodiment, the ceramic material used to fabricate transaction card 100 is substantially optically transparent (e.g., having an optical transparency greater than 70%).

Additional decorative features may be machined or produced using inkjet, drop on demand printing, or laser ablation. In one embodiment, a signature panel 115 is produced by ablating/etching a portion of monolithic ceramic body 105, thereby making that particular area of monolithic ceramic body 105 receptive to ink or dye. A user can then authenticate transaction card 100 by executing a signature directly onto monolithic card body 105. Alternatively, the user's signature can be digitized and then laser engraved onto the monolithic card body 105. By manufacturing signature panel 115 in this manner, cost savings are realized in the elimination of additional components and steps (e.g., a separate polymeric signature panel and the adhesive necessary to hold this separate component in place).

Other functional features (e.g., magnetic stripe, branding, hologram, etc.) and/or decorative designs may be applied directly to the surface of monolithic ceramic body or a pocket may be engraved into monolithic ceramic body 105 via laser or mechanical engraving to receive such features or designs.

Transaction card 100 may be characterized by the nominal dimensions of a standard sized card (e.g., 3.37"×2.125"×0.03"). One of ordinary skill in the art will understand that transaction cards of different dimensions may be made without departing from the scope of the invention disclosed herein.

Figure 2:
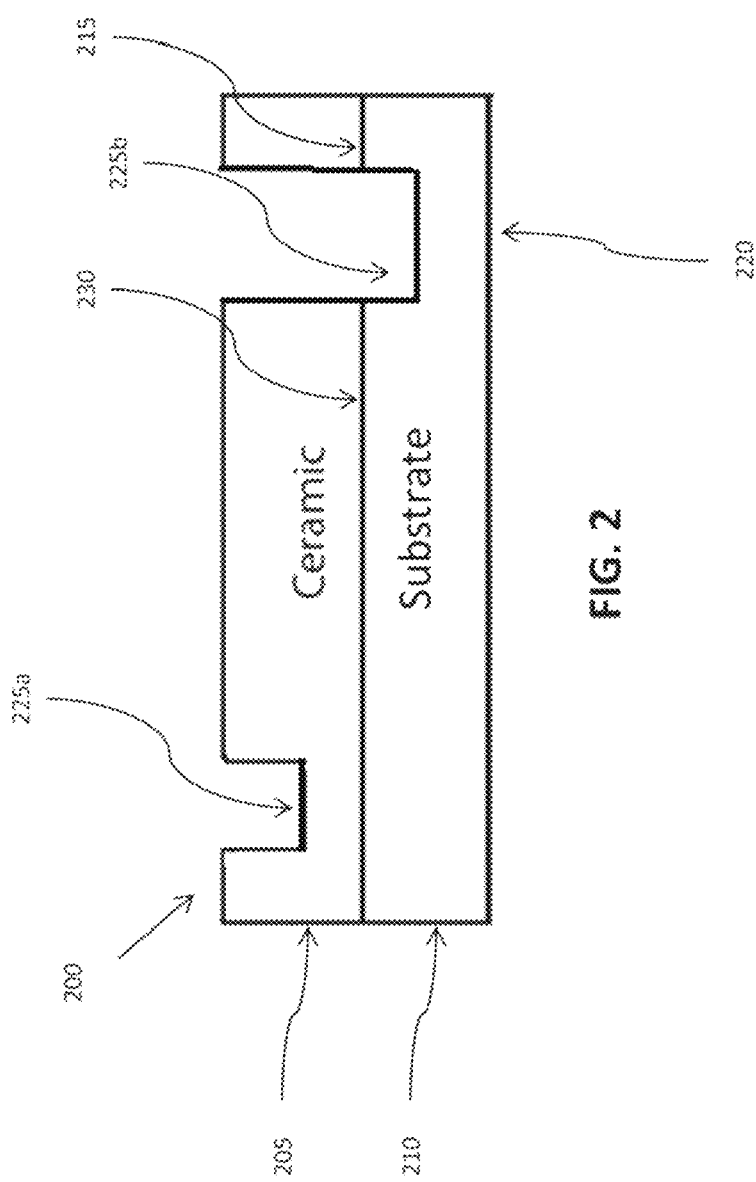
FIG. 2 depicts a cross-sectional diagram of an exemplary transaction card comprising a ceramic layer on a substrate.

Turning to FIG. 2, a cross-sectional diagram of transaction card 200 according to the present invention is shown. In this embodiment, transaction card 200 includes a substrate layer 210 having a first side 215 and a second side 220.

Substrate layer 210 may be any suitable metal, such as stainless steel, bronze, copper, titanium, tungsten carbide, nickel, palladium, silver, gold, platinum, aluminum, or any alloy which gives the card most of its body (structure) and weight. Additionally, or alternatively, substrate layer 210 may be one or a composite of any suitable polymeric (e.g., polycarbonate, polyester, PVC, PETG, PLA, and blends thereof) and inorganic (e.g., glass, ceramic, cellulosic) material. The invention is not limited, however, to any particular substrate material. In one embodiment, substrate layer 210 includes both a layer of metal connected to a second layer of polymeric or inorganic material. In another embodiment, substrate layer 210 includes a plurality of bonded metal layers.

The materials of a composite substrate layer 210 may be selected such that a specific weight is achieved or to display a particular color upon exposure of the ceramic layer(s) to laser marking. The materials may also be selected as a function of cost efficiency or other desirable benefits (e.g., metal/plastic composite cards with single and dual ceramic coatings may achieve desired manufacturing costs, weights, and artistic effects).

Substrate layer 210 may have a thickness ranging of 0.0005" to 0.0325". Where substrate layer 210 is a composite (e.g. multiple layers of metal, multiple layers of metal and another component), the first layer of substrate layer 210 may range from 0.0001" to 0.0315" and the second layer of substrate layer 210 may range from 0.0001" to 0.0315". Other suitable thicknesses for substrate layer 210 are within the scope of the invention and will become apparent upon review of the information and teachings disclosed herein.

First ceramic layer 205 is connected to first side 215 of substrate layer 210. It should be noted that any sort of direct or indirect connection between first ceramic layer 205 and the first side 215 of substrate layer will suffice. For example, the requisite connection could be achieved where first ceramic layer 205 is directly attached to or coated on an intermediary substrate (not shown), which intermediary substrate is adhered to substrate layer 210.

First ceramic layer 205 may have, for example, a thickness ranging from about 0.00075" to about 0.003" for sprayed ceramic and about 0.001" to about 0.0032" for solid ceramic, but the invention is not limited to any particular range of thicknesses.

A variety of methods may be used to connect first ceramic layer 205 and substrate layer 210. In one embodiment, first ceramic layer 205 is spray coated to a sufficient thickness onto substrate layer 210. The spray coated layer is then thermally, air, or UV cured.

FIGS. 3A and 3B depict an exemplary transaction card 300 deploying another manner of connecting first ceramic layer 205 and substrate layer 210 according to the present invention. In this embodiment, first ceramic layer 205 is an insert set into a pocket 240 (which may be created using, e.g., machining, lasering, milling) in first side 215 of substrate layer 210. An adhesive 230 may be used to adhere first ceramic layer 205 and substrate layer 210. Suitable adhesives may include epoxies, cyanoacrylate, acid modified polyolefin, silicone elastomers, and other naturally occurring adhesives, but the invention is not limited to any particular type of adhesive.

In another embodiment, first ceramic layer 205 is press-fit into pocket 240 in substrate layer 210. Press-fitting is intended to refer to any suitable means by which the ceramic insert is geometrically secured into pocket 240 in substrate layer 210. For example, one method of press-fitting includes "dove tailing" (not shown), in which one or more shapes in the edge of first ceramic layer 205 interlock with mating shapes in the inner edge of substrate layer 210. For example, a male feature in first ceramic layer may fit into a female receptor in the substrate, the ceramic layer may have a female receptor sized to receive a male feature in the substrate, or a combination thereof.

Figure 3C:
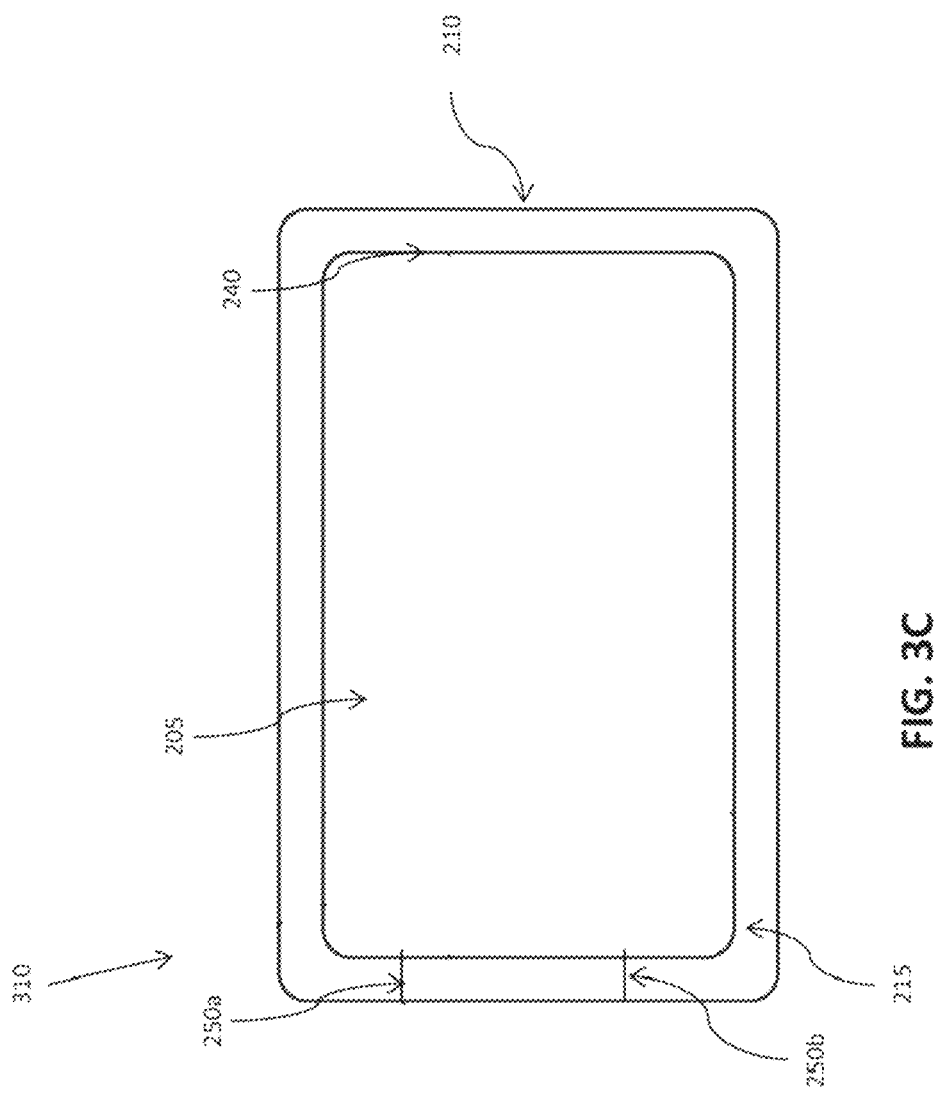
FIG. 3C depicts a plan view of an exemplary transaction card comprising a ceramic layer mounted inside a frame formed by the substrate layer.

Turning to FIG. 3C, still another embodiment for connecting first ceramic layer 205 to substrate layer 210 is depicted with respect to exemplary transaction card 310. In this embodiment, substrate layer 210 includes one or more tapped holes 250a,b such that substrate layer 210 acts as a frame, in which set screws disposed in the tapped holes hold first ceramic layer 205 within pocket 240. One of ordinary skill in the art will, upon reading this disclosure, appreciate the existence of other suitable methods for connecting first ceramic layer 205 and substrate layer 210 that fall within the scope of the present invention.

Turning back to FIG. 2, one or more pockets 225a,b in transaction card 200 are configured to receive one or more of the components described above, e.g., at least one of a magnetic stripe, one or more embedded microchips, a hologram, a signature panel, commercial indicia, or any other component typically contained on or within a transaction card. As depicted, one or more pockets 225a,b may extend for a portion or the entirety of the cross-sectional length of first ceramic layer 205 (225a) and/or, in some embodiments, into substrate layer 210 (225b). In some embodiments, one or more pockets 225a,b extend through the entirety of the cross-sectional length of the first ceramic layer 205, so that the desired components can bond directly to the substrate layer 210 (which can be, e.g., a metal layer).

In other embodiments, one or more pockets 225a,b may extend into substrate layer 210 without breaching the surface of first ceramic layer 205 (e.g., to contain a hidden component such as a booster antenna).

In still other embodiments, one or more pockets may also be produced in substrate layer 210 that ultimately result in depressions in the ceramic coating into which later components may be set to produce a smooth surface in transaction card 200.

For example, in an embodiment in which first ceramic layer 205 is spray coated onto substrate layer 210, one or more pockets 225a,b may be created by providing one or more pockets 225a,b in substrate layer 210 prior to spray-coating. However, it is not necessary to first create pockets in substrate layer 210; one or more pockets may be produced alternatively after spray-coating. Any suitable process may be used to create the one or more pockets 225a,b in substrate layer 210 such as, e.g., mechanical engraving, chemical laser etching, milling, etc.

In one embodiment, first ceramic layer 205 is a sprayed ceramic layer applied to substrate layer 210, which is a polycarbonate sheet. The polycarbonate sheet may be laminated to a desired thickness, bead blasted, sprayed with ceramic to create first ceramic layer 205, and then cured. Individual transaction cards 200 may be produced through punching, lasering, machining, or any other method known in the art.

As described above, various colors and textures may be imparted to transaction card 100. Color may be introduced to transaction card 200 by an overcoat or by adding pigments and/or dyes into the ceramic body. In one embodiment, the ceramic material used to fabricate transaction card 200 is substantially optically transparent, revealing the color and appearance of underlying substrate layer 210.

Figure 4A:
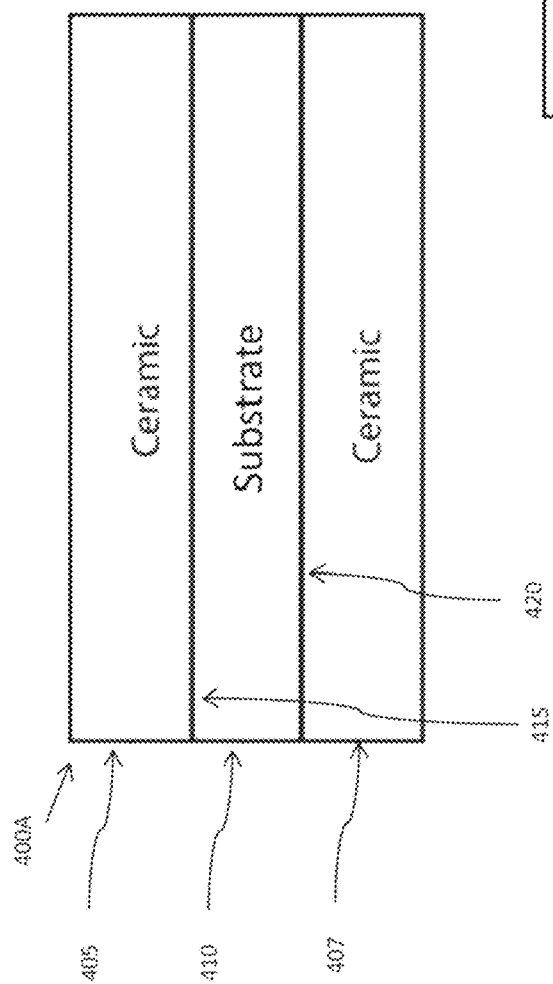
FIG. 4A depicts a cross-sectional view of an exemplary transaction card construction comprising a substrate layer, a first ceramic layer and a second ceramic layer.
Figure 4B:
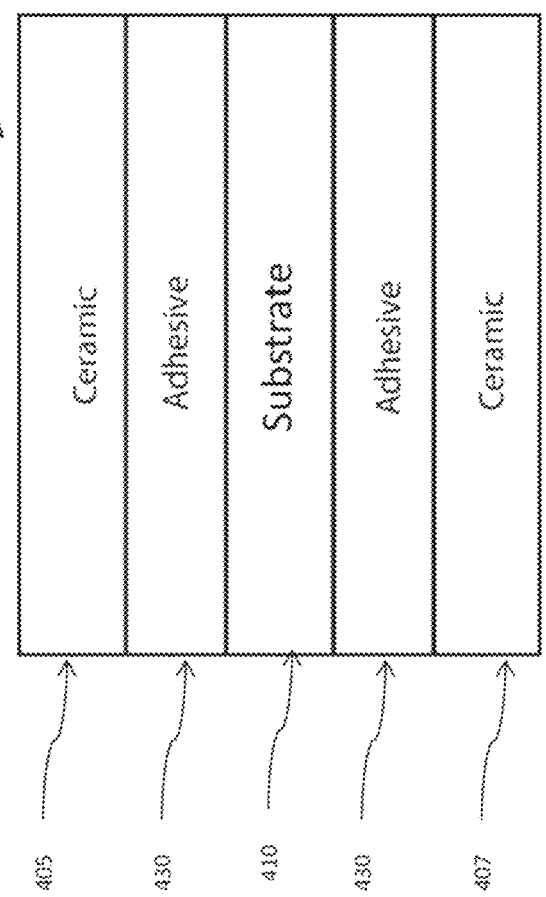

FIGS. 4A and 4B depict cross-sectional diagrams of exemplary transaction cards 400A and 400B respectively, according to exemplary embodiments of the present invention. In these embodiments, transaction card 400A includes a substrate layer 410 having a first side 415 and a second side 420.

First ceramic layer 405 is connected to first side 415 of substrate layer 410.

Second ceramic layer 407 is connected to second side 420 of substrate layer 410. As described above, any sort of direct or indirect connection between first ceramic layer 405, second ceramic layer 407, and the respective sides of substrate layer 410 (including through intermediary layers) will suffice.

Any of the connection methods, or combination of these methods, described above (e.g., coating on, press-fitting in, or adhering to the substrate layer) may be used to connect first ceramic layer 405 and second ceramic layer 407 with substrate layer 410. For example, first ceramic layer 405 may be spray coated on first side 415 of substrate layer 410, while second ceramic layer 407 may be press-fit into a pocket defined in the second side 420 of substrate layer 410. As another example, shown in FIG. 4B, first ceramic layer 405 may be adhered to first side 415 of substrate layer 410 and second ceramic layer 407 may be adhered to the second side 420 of substrate layer 410 by adhesive layers 430.

Figure 5:
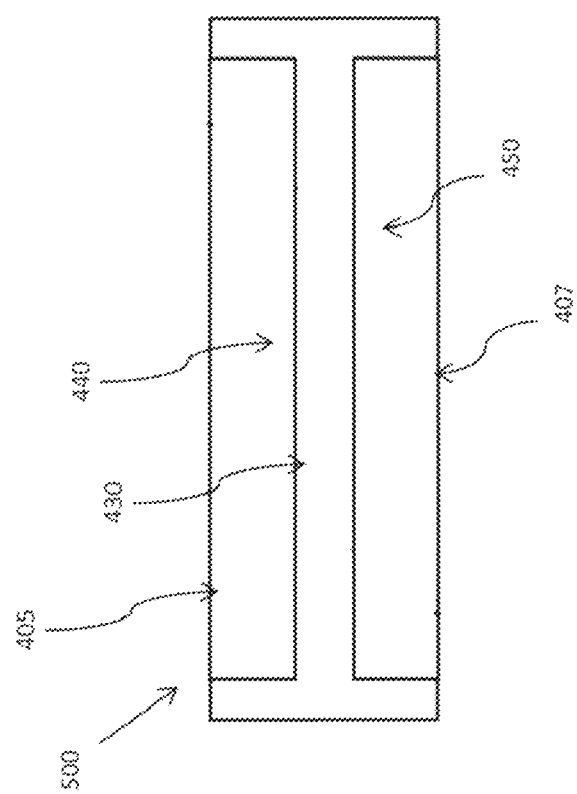
FIG. 5 depicts a cross-sectional view of yet another exemplary transaction card construction comprising a substrate layer, a first ceramic layer and a second ceramic layer.

Similar to the card depicted in FIG. 38, FIG. 5 depicts a card 500 comprising a first ceramic layer 405 and second ceramic layer 407, which are inserts set into pockets 440 and 450 (which may be created using, e.g., machining, lasering, milling) in substrate layer 410. As above, the ceramic layers may be press-fit, or an adhesive, such as but not limited to epoxies, cyanoacrylate, acid modified polyolefin, silicone elastomers, and other naturally occurring adhesives, may be used to adhere, the ceramic layers into pockets 440 and 450.

Figure 6:
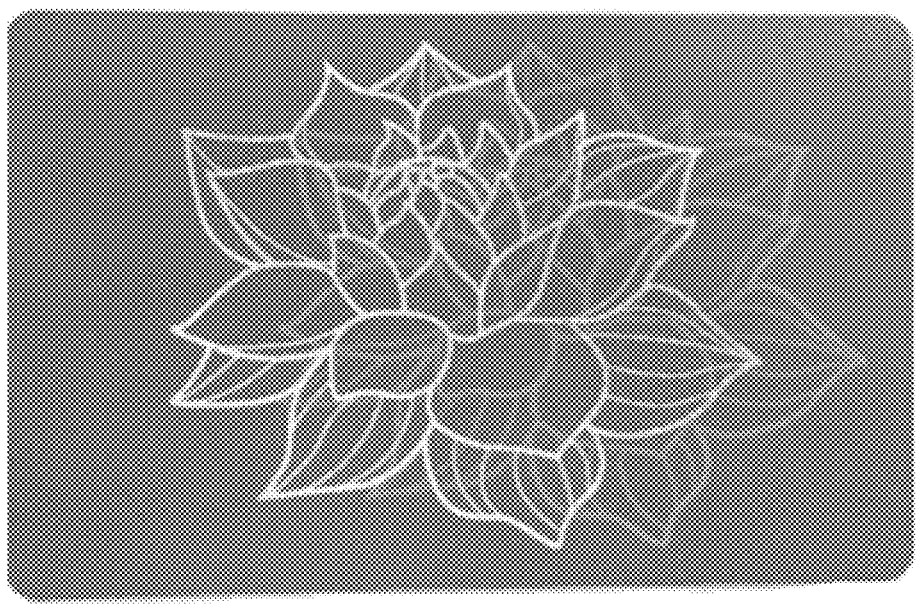
FIG. 6 depicts a plan view image of an exemplary ceramic card having a flower design thereon.
Figure 7:
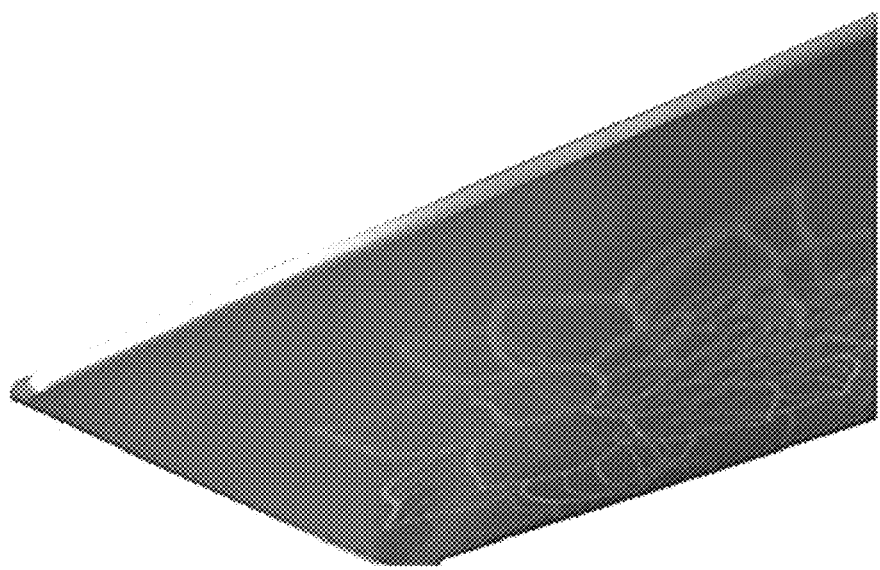
FIG. 7 depicts an edge view of the exemplary card of FIG. 6.

In one exemplary embodiment, 0.02" thick metal core (such as steel) may be bonded to a 0.007" thick PVC layer on one side with a ceramic coating on the un-bonded surface of the metal core. The ceramic may be applied as a spray coating, which is then cured. After curing, the coating may range from, e.g., 0.001" to 0.003" thick, depending on the desired look and texture of the coating. The coatings may, as described above, be produced in a variety of colors. The coating may be comprised of ceramic microparticles and a curable resin binder suspended in a carrier solution. Exemplary ceramic micropartide or nanoparticle materials may include one or more of the following: zirconia dioxide, aluminum disilicide, aluminum cerium oxide, aluminum oxide, aluminum titanate, antimony(III) oxide, antimony tin oxide, barium ferrite, barium strontium titanium oxide, barium titanate(IV), barium zirconate, bismuth cobalt zinc oxide $(Bi_2O_3)_{0.07}(CoO)_{0.03}(ZnO)_{0.90}$ bismuth(III) oxide, boron nitride, calcium oxide, calcium phosphate, calcium titanate, calcium zirconate, cerium iron oxide hydroxide aqueous nanoparticlde dispersion, cerium(IV) oxide, cerium (IV)-zirconium(IV) oxide, chromium(III) oxide, cobalt aluminum oxide, cobalt(II,III) oxide, copper iron oxide, copper zinc iron oxide, dysprosium(III) oxide, erbium(III) oxide, europium(III) oxide, titania, silica, ceria, alumina, iron oxide, vanadia, zinc oxide, tin oxide, nickel oxide, and combinations thereof, but the invention is not limited to any particular ceramic materials. Commercial examples of polyceramic coatings containing both polymeric and ceramic components include those sold in connection with the trade names CERAKOTE by NIC Industries, Inc., Ceraset™ by KION International, and DuraCoat, DuraBake, DuraHeat, by Dura Coat Products, Inc. the manufacturer's specifications for which are hereby incorporated by reference. Once sprayed and cured, the coating provides a unique color and texture to the cards along with a durable finish, typically reaching several thousand Taber abrader cycles. The ceramic coating may be modified with mechanical or chemical engraving, inkjet printing, laser marking and other methods known in the art to provide a desired artistic effect. One example of such an effect is depicted in FIGS. 6 and 7, which depict a card having a flower design, such as may be produced via laser marking.

The ceramic portions of the transaction cards disclosed herein may be manufactured using, e.g., injection molding to achieve a desired shaped, followed by sintering/firing of the molded unit. One or more pockets (FIG. 1, element 110) may be created during the injection molding process.

Additionally, Instead of injection molding, the ceramic portions of the transaction cards disclosed herein may be stamped or tape cast prior to firing. One of ordinary skill in the art will understand that additional methods may be used to manufacture transaction cards according to the present invention. For example, such cards may be created from larger blocks of ceramic and be machined to a desired size using an endmill, laser, waterjet, 3D printing, or any other means known in the art.

Figure 8:
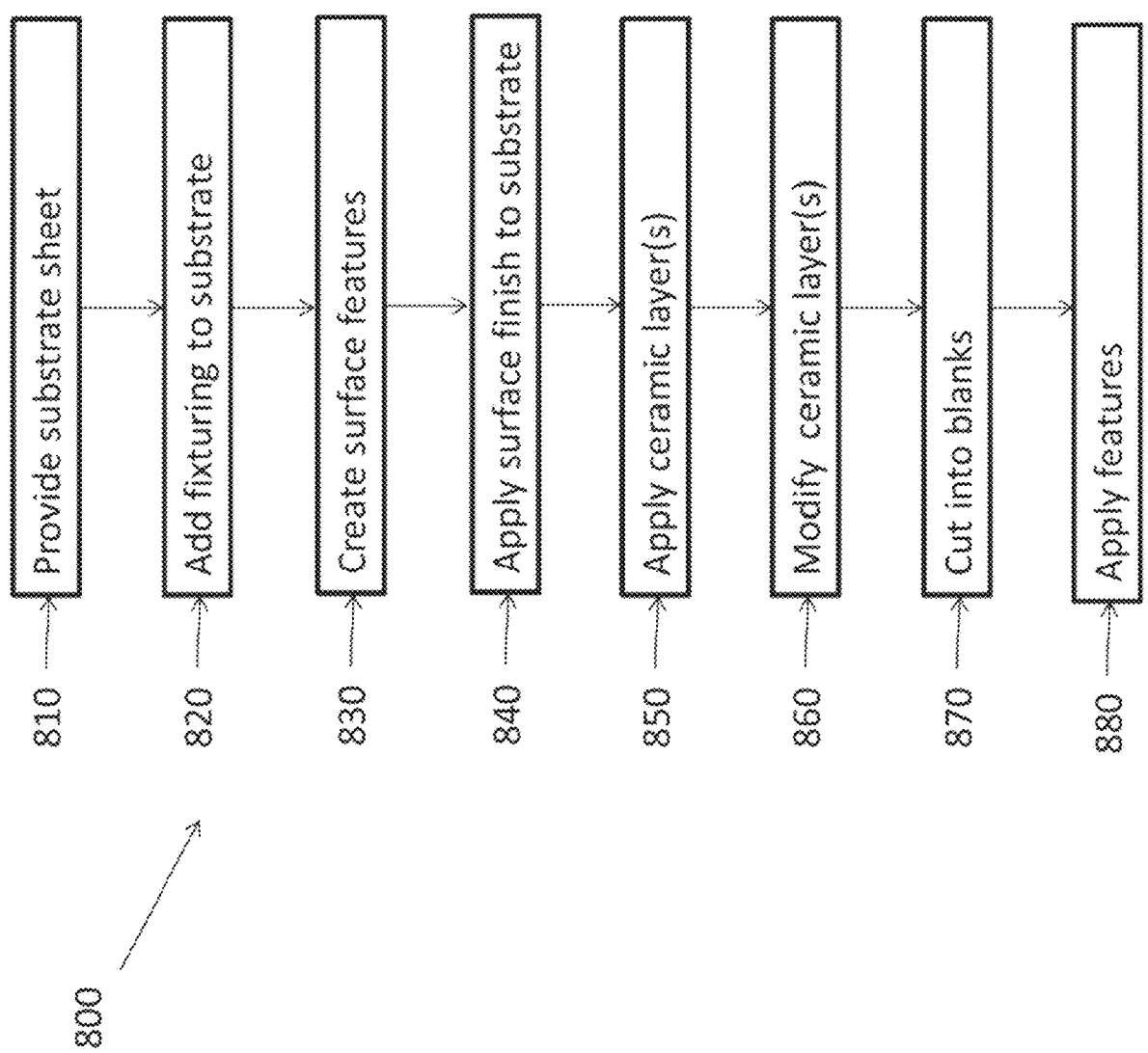
FIG. 8 is a flowchart of showing exemplary steps of an exemplary process for manufacturing an exemplary ceramic card embodiment.

Turning to FIG. 8, a flow diagram depicting selected steps of a process 800 for manufacturing a transaction card according to aspects of the present invention is shown. It should be noted that, with respect to the methods described herein, it will be understood from the description herein that one or more steps may be omitted and/or performed out of the described sequence of the method (including simultaneously) while still achieving the desired result.

In step 810, a substrate layer, e.g., a metal core sheet, is provided. Optionally, this step may include laminating a suitable metal foil, such as an aluminum foil, to one or more surfaces of an inner sub-core (which may be, e.g., metal, polymeric, or inorganic).

In step 820, fixtures are added to the substrate layer to hold the layer in place while subsequent steps are performed.

In step 830, one or more pockets are provided in the substrate layer for receiving functional or decorative features. For example, a pocket may be defined to receive a booster antenna for use in connection with an RFID chip, which can be disposed below the ceramic layer. Pockets may also be produced in the substrate layer that ultimately result in depressions in the ceramic coating into which later components (such as the RFID chip) can be attached at the end of processing, to provide for a smooth surface in the final product.

In step 840, the substrate layer receives a surface finish. Surface finishing can include any method suitable for the particle materials of the substrate layer such as, e.g., bead blasting, tumbling, brushing, etc.

In step 850, one or more ceramic layers and/or coatings are applied to the substrate layer through, e.g., spray coating. The one or more ceramic layers/coatings may also be connected, as described above, through defining pocket(s) in the side(s) of the substrate layer and press-fitting or adhering ceramic insert(s) Into the pocket(s).

In step 860, the ceramic layer(s)/coatings are laser marked with designs or other surface features. Additional mechanical, chemical, or laser modifications needed to facilitate later attachment of other features or design components is also performed. For example, edges of any pockets or depressions may be processed for a better fit of features to be added in a subsequent step or areas where an adhesive is later applied may be roughened for better adhesion.

In step 870, the composite sheet is cut into card blanks using, e.g., a CNC (computer numerical control) machine.

In step 880, functional and security features are applied to the individual card blanks. As noted above, such features may fit in a pocket created earlier in the process or adhesively attached to an area that has been roughened. In one embodiment, the magnetic stripe is applied directly on the ceramic layer. This desirably optimizes the planar and flat characteristics of the transaction card surface Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A process for making a card, the process comprising the steps of:
   (a) forming a core layer having a first surface and a second surface;
   (b) disposing an uncured decorative ceramic layer, comprising ceramic particles disposed in a resin binder, over the first surface of the core layer; and
   (c) curing the uncured decorative ceramic layer to form a cured decorative ceramic layer;
   wherein step (b) comprises spray coating the decorative ceramic layer over the first surface of the core layer.

2. The process of claim 1, wherein the spray coating comprises a mixture comprising zirconia dioxide, aluminum disilicide, the pigment, and the binder suspended in a volatile organic carrier solution.

3. The process of claim 1, further comprising the step of forming one or more pockets in the core layer or the cured decorative ceramic layer.

4. The process of claim 3, comprising disposing a contact or DI chip module in the pocket such that an exposed outer surface of the contact or DI chip module is smoothly aligned with an exposed outer surface of the cured decorative ceramic layer.

5. The process of claim 1, comprising forming at least one pocket in the core layer prior to performing steps (b) and (c).

6. A process for making a card, the process comprising the steps of:
   (a) forming a core layer having a first surface and a second surface;
   (b) disposing an uncured decorative ceramic layer, comprising ceramic particles disposed in a resin binder, over the first surface of the core layer;
   (c) curing the uncured decorative ceramic layer to form a cured decorative ceramic layer; and
   (d) forming at least one pocket in the core layer prior to performing steps (b) and (c);
   wherein performing steps (b) and (c) results in a depression in the ceramic layer overlying the at least one pocket, and the process further comprises disposing a component in the depression such that the component and the cured decorative ceramic layer not overlying the pocket define a smooth surface.

7. A process for making a card, the process comprising the steps of:
   (a) forming a core layer having a first surface and a second surface;
   (b) disposing an uncured decorative ceramic layer, comprising ceramic particles disposed in a resin binder, over the first surface of the core layer;
   (c) curing the uncured decorative ceramic layer to form a cured decorative ceramic layer;
   (d) forming at least one pocket in the core layer prior to performing steps (b) and (c); and
   (e) disposing a component in the pocket prior to performing steps (b) and (c), such that the component is disposed below the cured decorative ceramic layer after performing steps (b) and (c).

8. The process of claim 7, wherein the component comprises a booster antenna.

9. The process of claim 1, comprising forming said at least one pocket in the cured decorative ceramic layer after performing steps (b) and (c).

10. The process of claim 9, comprising forming said at least one pocket having a depth that extends to said core layer, and securing a component to said core layer within said pocket.

11. The process of claim 1, further comprising providing an artistic effect on the cured decorative ceramic layer by performing an engraving step, a printing step, or a laser marking step.

12. A process for making a card, the process comprising the steps of:
   (a) forming a core layer having a first surface and a second surface;
   (b) disposing an uncured decorative ceramic layer, comprising ceramic particles disposed in a resin binder, over the first surface of the core layer; and
   (c) curing the uncured decorative ceramic layer to form a cured decorative ceramic layer; and
   wherein step (c) comprises a thermal curing step.

13. A process for making a card, the process comprising the steps of:
   (a) forming a core layer having a first surface and a second surface;
   (b) disposing an uncured decorative ceramic layer, comprising ceramic particles disposed in a resin binder, over the first surface of the core layer; and
   (c) curing the uncured decorative ceramic layer to form a cured decorative ceramic layer; and
   wherein step (c) comprises an air-curing step.

14. The process of claim 1, wherein step (c) comprises a UV curing step.

15. A process for making a card, the process comprising the steps of:
   (a) forming a core layer having a first surface and a second surface;
   (b) disposing an uncured decorative ceramic layer, comprising ceramic particles disposed in a resin binder, over the first surface of the core layer;
   (c) curing the uncured decorative ceramic layer to form a cured decorative ceramic layer; and
   (d) applying a surface finish to the first surface of the core prior to performing step (b).

16. The process of claim 1, further comprising conducting at least steps (a)-(c) on a sheet comprising a plurality of cards, and then cutting the sheet into a plurality of card blanks.

17. The process of claim 1, further comprising providing the card with one or more functional or security features.

18. The process of claim 17, wherein the one or more functional or security features comprises a magnetic stripe, signature panel, or a hologram.

19. The process of claim 1, further comprising laser-marking at least one feature on the cured decorative ceramic layer.

20. The process of claim 1, further comprising removing a portion of the cured decorative ceramic layer to reveal a visible portion of a layer underlying the cured decorative ceramic layer.

21. The process of claim 1, further comprising creating a design on or in the cured decorative ceramic layer comprising at least two colors or tones different than a color of the cured decorative ceramic layer.

22. A process for making a card, the process comprising the steps of:
   (a) forming a core layer having a first surface and a second surface;
   (b) disposing an uncured decorative ceramic layer, comprising ceramic particles disposed in a resin binder, over the first surface of the core layer;
   (c) curing the uncured decorative ceramic layer to form a cured decorative ceramic layer; and
   (d) creating one or more surface features on the first surface of the core layer prior to step (b), wherein the one or more surface features result in depressions in the cured decorative ceramic layer.

23. A card comprising a product of the process of claim 22.

24. The card of claim 23, wherein the visible portion revealed by the step of removing the portion of the cured decorative ceramic layer comprises a portion of the core layer.

25. The card of claim 23, further comprising an intermediate layer having a desired color disposed between the core layer and the cured decorative ceramic layer, wherein the visible portion revealed by the step of removing the portion of the cured decorative ceramic layer comprises a portion of the intermediate layer.

26. The card of claim 23, wherein one of the core layer, a layer between the core layer and the cured decorative ceramic layer, or a combination thereof, includes a first metal layer and a second metal layer, wherein the visible portion revealed by the step of removing the portion of the cured decorative ceramic layer comprises respective portions of the first metal layer and the second metal layer.

27. A card comprising a product of the process of claim 1.

28. The card of claim 27, wherein core layer comprises metal, ceramic, or a combination thereof and forms a bulk of the card.

29. The card of claim 27, wherein the core layer has a predetermined color and texture, and the cured decorative ceramic layer has one of a different color and different texture relative to the core layer.

30. The card of claim 27, further comprising a second decorative layer attached to the second surface of the core layer.

31. The card of claim 30, wherein the second decorative layer comprises a ceramic material.

32. The card of claim 30, wherein the second decorative layer is different from the cured decorative ceramic layer on the first surface of the core.

33. The card of claim 32, wherein the second decorative layer includes one of (a) an anodized metal layer, (b) a plant derived material veneer layer; (c) an animal derived material veneer layer; (d) an aggregate binder material veneer layer; and (e) a layer of crystal fabric material.

34. The card of claim 27, further comprising an integrated circuit module located within said card for enabling at least one of: (a) wireless radio frequency (RF) transmission between the card and an external card reader; and (b) contact reading between the card and a contact reader.

35. The card of claim 27, further comprising a polymeric layer attached to the bottom surface of the core layer.

36. The card of claim 35, wherein the polymeric layer comprises PVC.

37. The card of claim 27, further comprising further comprising at least one of: a magnetic stripe, a signature panel, branding, a hologram, or another functional feature applied directly to a surface of the ceramic layer.

38. The card of claim 37, further comprising a pocket in the ceramic layer that extends to the metal core, wherein at least one of: a magnetic stripe, a signature panel, branding, a hologram, or another functional feature is bonded to the metal core in the pocket.

39. The card of claim 27, further comprising a pocket formed in a first surface of the core layer, wherein the cured decorative ceramic layer is attached to the core layer within the pocket.

40. The card of claim 39, wherein the core comprises a metal layer, and the top surface of the metal layer defines a frame around the pocket extending to an outer periphery of the metal layer, and the pocket has a depth substantially equal to a thickness of the cured decorative ceramic layer.

41. The card of claim 27, wherein the cured decorative ceramic layer contains phosphors operative to shift incident light upfield or downfield to create an identifying image.

42. The card of claim 41, wherein the phosphors define a watermark.

43. A card comprising a product of a process of for making a card, the process comprising the steps of:
  (a) forming a core layer having a first surface and a second surface;
  (b) disposing an uncured decorative ceramic layer, comprising ceramic particles disposed in a resin binder, over the first surface of the core layer; and
  (c) curing the uncured decorative ceramic layer to form a cured decorative ceramic layer; and
  attaching a second decorative layer to the second surface of the core layer, wherein the second decorative layer is different from the cured decorative ceramic layer on the first surface of the core.

44. The card of claim 43, wherein the second decorative layer includes one of (a) an anodized metal layer, (b) a plant derived material veneer layer; (c) an animal derived material veneer layer; (d) an aggregate binder material veneer layer; and (e) a layer of crystal fabric material.

45. The card of claim 43, wherein the cured decorative ceramic layer contains phosphors operative to shift incident light upfield or downfield to create an identifying image.

46. The card of claim 43, wherein the phosphors define a watermark.

* * * * *